E. M. SCOVILLE.
METALLIC PACKING FOR PUMPS.
APPLICATION FILED OCT. 31, 1911.
1,024,425.
Patented Apr. 23, 1912.
2 SHEETS—SHEET 2.
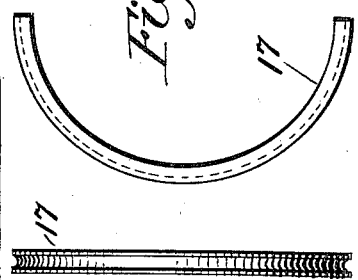
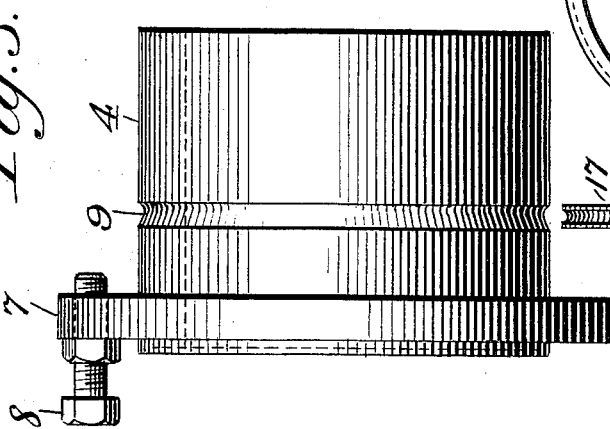
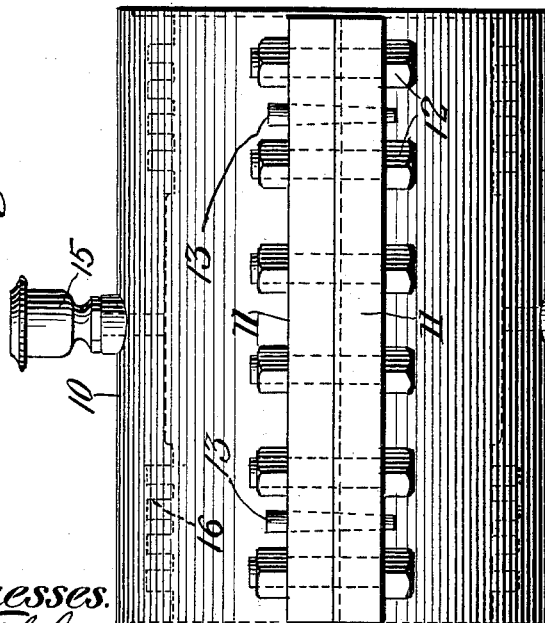

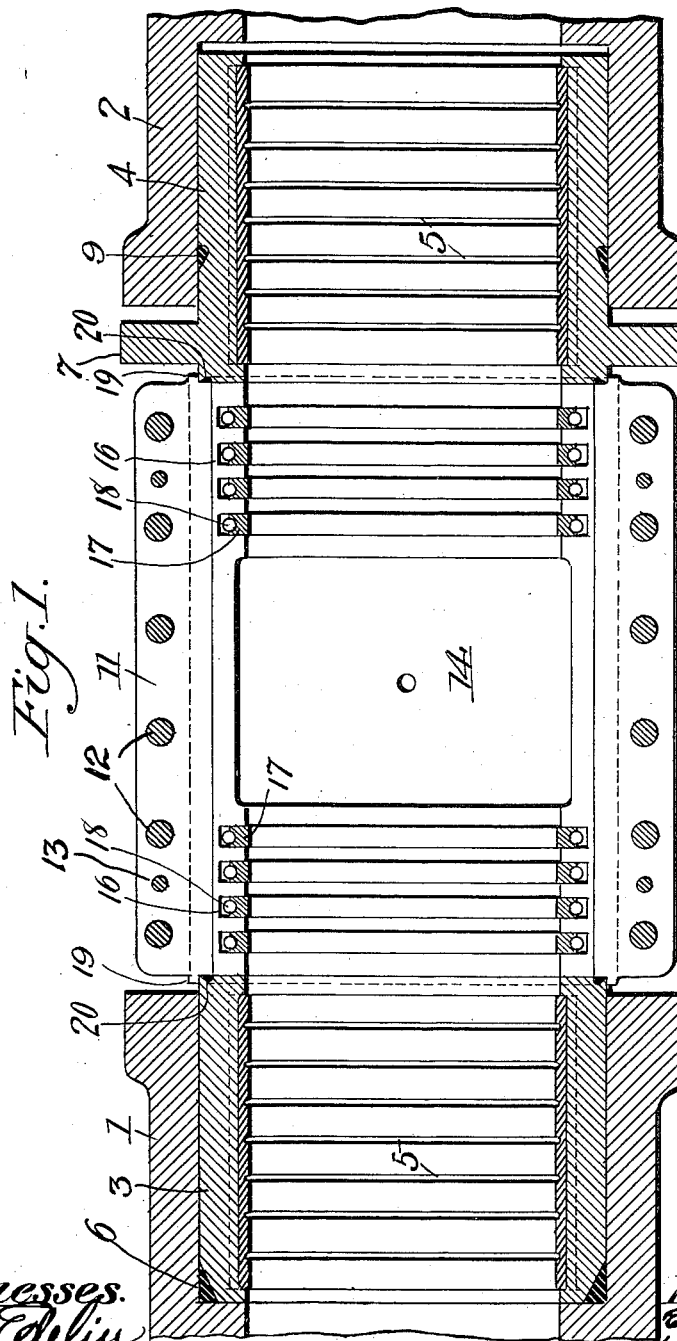

UNITED STATES PATENT OFFICE.

EUGENE M. SCOVILLE, OF WAIPAHU, TERRITORY OF HAWAII.

METALLIC PACKING FOR PUMPS.

1,024,425.  Specification of Letters Patent.  Patented Apr. 23, 1912.

Application filed October 31, 1911. Serial No. 657,779.

*To all whom it may concern:*

Be it known that I, EUGENE M. SCOVILLE, a citizen of the United States, residing at Waipahu, county of Honolulu, Territory of Hawaii, have invented certain new and useful Improvements in Metallic Packing for Pumps; and I do hereby declare the following to be a full, clear, and exact description of the invention, such as will enable others skilled in the art to which it appertains to make and use the same.

This invention relates to metallic packing for pumps, and is particularly applicable to pumps having two chambers with a plunger working in a stuffing box on each chamber, the stuffing boxes being opposed to each other.

The object of the invention is to produce a packing which will prevent water and air leaks around the plunger, reduce the friction and wear on the plunger, prevent loss of time in shut downs for renewals of packing, and effect a saving in the cost of packing used.

A further object is to produce a metallic packing which will accomplish the objects mentioned and which can be easily applied to existing pumps without necessitating any material alteration.

In pumps of the type above mentioned, such as the Riedler for example, hemp or similar packing is usually employed in the stuffing boxes. To prevent air and water leaks around the plunger, the glands have to be tightened so that the hemp or similar packing causes excessive friction and wear on the plunger.

This invention contemplates the removal of the glands and old packing from the stuffing boxes, and the substitution of a metallic bushing in each stuffing box and the application of a novel coupling box made in halves between the ends of said bushings and provided with a grease chamber in its middle portion and with a series of metallic packing half rings between the grease chamber and the ends of the coupling box. Means are also provided for sealing the joints, as will hereinafter fully appear.

In the accompanying drawings, forming a part of this specification, Figure 1 represents in longitudinal section a portion of one form of metallic packing embodying my invention as applied to a pump, the plunger being removed for the sake of clearness. Fig. 2 is an elevation of the coupling box. Fig. 3 is an elevation of one of the metallic bushings with flange. Figs. 4 and 5 are details of one of the metallic packing half rings. Fig. 6 is a detail of a spiral tension spring.

Referring to the drawings, 1 and 2 represent the walls of the stuffing boxes of the two pump chambers from which the glands and old packing have been removed. The bushings 3 and 4, of cast iron babbitted, are turned to fit inside of the stuffing boxes 1 and 2 respectively. Both bushings are bored to suit the pump plunger, and water grooves 5 are cut in the Babbitt. The bushing 3 is made slightly longer than the depth of the stuffing box 1, and the joint between same is sealed by round rubber packing in the space 6. The bushing 4 is provided with a flange 7 and setting-up screws 8. The joint between the bushing 4 and the stuffing box 2 is sealed by round rubber packing in the groove 9 turned in the bushing 4 as shown.

The coupling box 10 is made in halves provided with flanges 11 bolted together by the bolts 12 and alinement is secured by dowels 13. The joints between the flanges 11 are made tight by rubber packing in longitudinal grooves preferably cut in the lower flanges. The bore of the coupling box 10 is slightly larger than the pump plunger. The central chambered portion 14 of the coupling box 10 is supplied with grease by a compression grease cup 15 on the top half of the coupling box. The lower half of the coupling box 10 may be tapped for a drain cock. Between the grease chamber 14 and each end of the coupling box 10 recesses 16 are formed to receive the metallic packing half rings 17. These half rings 17, preferably of gun metal, are each slightly shorter than a semi-circle, and are yieldingly pressed against the pump plunger by a spiral tension spring 18 placed in their grooved periphery with the ends of the spring hooked together. The ends of the coupling box 10 are provided with circular lips 19 adapted to overlap the outer ends of the bushings 3 and 4 respectively. The outer ends of the bushings 3 and 4 have annular grooves 20 to receive round rubber packing to seal the joints between the ends of the coupling box 10 and said bushings. The method of procedure to apply this metallic packing will now be understood. The plunger, glands and old packing having been removed from the two pump chambers, the metallic bushings 3 and 4 are placed in the stuffing boxes 1 and 2 with the round rubber packing in the space 6 and groove 9 respectively. The plunger is then inserted in the bushings 3 and 4. The metallic packing half rings 17 are now assembled on the plunger, each pair being held in place by a spring 18. Rubber packing is cemented in the grooves 20 in the ends of the bushings 3 and 4. The lower half of the coupling box 10 is now placed under the plunger, the pairs of metallic packing half rings 17 being slid along the plunger until each fits into its respective recess 16. The upper half of the coupling box 10 is now placed over the lower half with rubber packing in the longitudinal grooves of the flanges, and the halves are clamped together by the bolts 12, the dowels 13 insuring alinement. The setting-up screws 8 are now turned in the flange 7, their ends impinging the face of the stuffing box 2 and causing the bushing 4 to slide in said stuffing box and move slightly outward, until the outer ends of the bushings 3 and 4 abut the ends of the coupling box 10 with the lips 19 overlapping, as shown in Fig. 1.

I claim:

1. A metallic packing for pumps comprising, two metallic bushings, and a coupling box in halves bolted together between the ends of said bushings, said coupling box containing metallic half rings, substantially as described.

2. A metallic packing for pumps comprising, two metallic bushings, a coupling box between said bushings provided with lips overlapping the outer ends of the bushings, and means for sealing the joints between the bushings and coupling box.

3. A metallic packing for pumps comprising, two bushings one of which is provided with a flange and setting-up screws, said bushings adapted to fit in the stuffing boxes of the two pump chambers, a plunger working in said bushings, a coupling box surrounding the plunger between the bushings and containing metallic packing rings in segments with means for pressing the segments against the plunger, and means for sealing the joints between the bushings and stuffing boxes and between the bushings and coupling box.

4. In a metallic packing for pumps, two bushings, a coupling box between said bushings containing metallic packing spring pressed segments, packing interposed between the ends of said bushings and the coupling box, and means for moving one bushing toward the other bushing so as to compress said packing.

5. A metallic packing for pumps comprising, two bushings, one of said bushings provided with a flange and setting-up screws, a coupling box between said bushings having a grease chamber and spring pressed packing ring segments between the grease chamber and the ends of the coupling box, and means for sealing the joints between the bushings and the coupling box.

In testimony whereof I affix my signature, in presence of two witnesses.

EUGENE M. SCOVILLE.

Witnesses:
I. P. KIMBALL,
ROBT. J. PRATT.